United States Patent Office 3,228,895
Patented Jan. 11, 1966

3,228,895
INFUSIBLE SILYLAMINE POLYMER AND
PROCESS FOR PRODUCING SAME
Robert E. Burks, Jr., James C. Lacey, Jr., and Thomas
W. Ray, Birmingham, Ala., assignors to Southern
Research Institute, Birmingham, Ala., a corporation of
Alabama
Filed May 15, 1963, Ser. No. 280,609
12 Claims. (Cl. 260—2)

This invention relates to an infusible silylamine polymer and process for producing the same and more particularly to such silicon-nitrogen polymers which have extremely high thermal and chemical stability.

An object of our invention is to provide an infusible silylamine polymer which is not sensitive to moisture.

Another object of our invention is to provide an infusible silylamine polymer which is adapted to adhere to metals, glass and other materials, thereby particularly adapting our improved product for use as coating agents.

Another object of our invention is to provide silylamine polymers which shall be soluble in organic solvents, such as benzene, and yet have low enough volatility to remain in place as thin films while being cured at elevated temperatures to form an infusible polymer.

A further object of our invention is to provide an infusible silylamine polymer which shall be adapted to blend with other compounds.

As is well known in the art to which our invention relates, the moisture sensitivity of silylamines has been the principal obstacle to their utilization on a commercial scale. Also, silylamine polymers produced heretofore have been in the form of thermoplastic materials which are viscous liquids or solids that were fusible, moisture-sensitive and soluble in organic solvents. For example, Groszos and Hall, in Patent No. 2,885,370, disclose a method wherein hexaphenylcyclotrisilazane is converted into plastic materials by heating at temperatures ranging from 450° C. to 700° C. in sealed tubes. Apparently, the pressure resulting from the use of sealed tubes was critical in determining the character of the product produced by Groszos and Hall.

In accordance with the present invention, we produce an infusible polymer of exceptional stability to heat, acids, alkali, and organic solvents. Instead of carrying out the polymerization in sealed tubes which causes an increase in pressure because of the benzene evolved, our polymerization is carried out at atmospheric pressure and at elevated temperatures whereby an infusible solid polymer is produced instead of a thermoplastic material.

Figure 1:
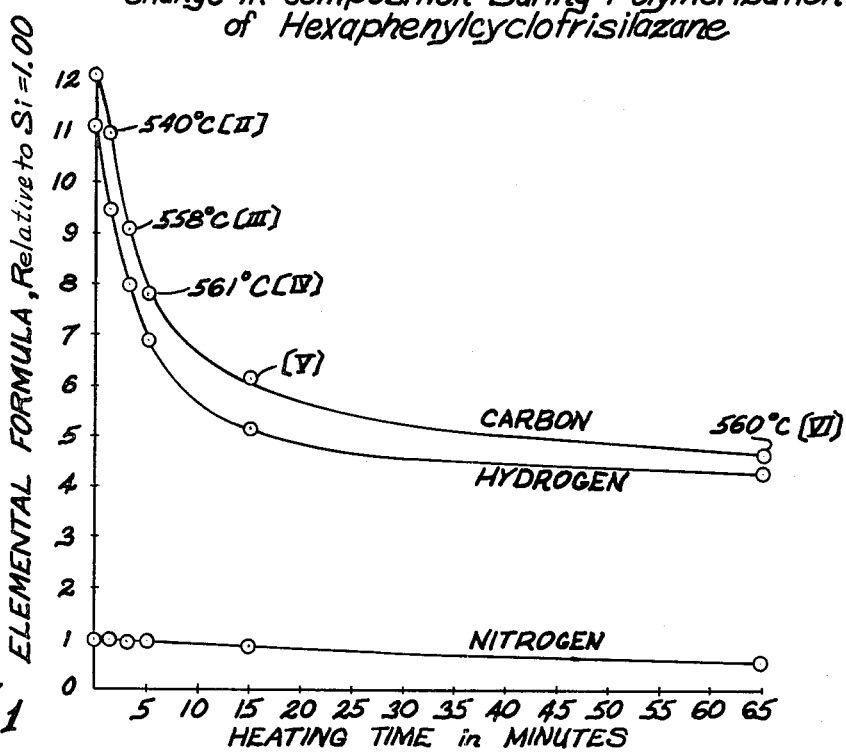
Figure 2:
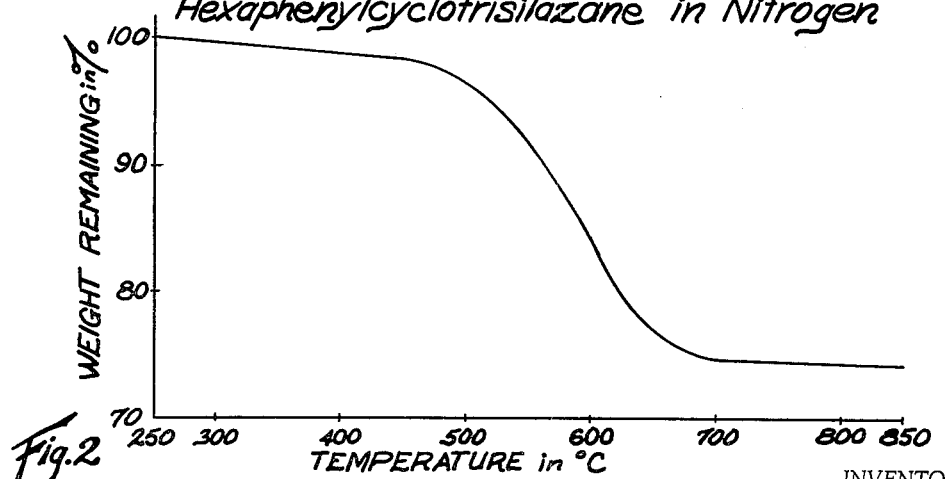

Graphs illustrating features of our invention are illustrated in the accompanying drawing, forming a part of this application, in which:

FIG. 1 is a graph showing the change in composition during polymerization of hexaphenylcyclotrisilazane; and,
FIG. 2 is a graph showing the thermogravimetric analysis of hexaphenylcyclotrisilazane in nitrogen.

In view of the fact that our condensation polymerization has been observed with numerous silylamines that are formed by the reaction of chlorosilanes and amines, it is believed that our improved reaction is general for silylamines that can be maintained in a non-vaporized state at approximately 420° C. to 575° C.

As is well known in the art to which our invention relates, hexaphenylcyclotrisilazane, a solid melting at 215° C., may be readily prepared by the reaction of diphenyldichlorosilane with ammonia. In accordance with our invention, hexaphenylcyclotrisilazane is heated above 420° C. in a reaction zone which is open to the atmosphere whereby it evolves benzene slowly and becomes progressively more viscous. As polymerization proceeds to form the infusible solid product, the composition changes from $(C_6H_5)_2SiNH$ to approximately $C_6H_5SiN$.

The mechanism of polymerization to the infusible solid is believed to involve primarily intermolecular condensation of silicon-phenyl and nitrogen-hydrogen groups with the formation of benzene.

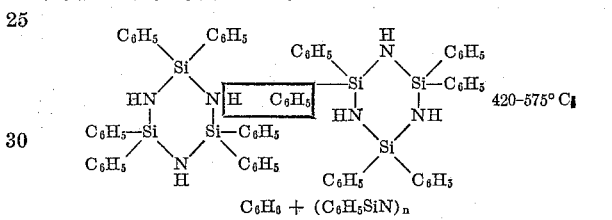

$C_6H_6 + (C_6H_5SiN)_n$

The following examples are given by way of illustration to show how our improved reaction is carried out to produce an infusible hexaphenylcyclotrisilazane polymer and other polymers.

EXAMPLE I

Hexaphenylcyclotrisilazane is heated in a glass vessel open to the atmosphere whereupon it melts at 215° C. Upon elevating the temperature, the melt starts to evolve benzene slowly at 420° C. When the temperature reaches approximately 510° C. benzene is evolved vigorously. After five minutes of vigorous evolution of benzene the temperature is elevated to approximately 560° C. whereupon the mass begins to solidify. Continued heating converts the entire mass to a foamed, pale yellow, brittle solid that is transparent when viewed under a microscope. The elemental composition of this polymer is listed in Table 1, as sample V, and is the infusible polymer having extreme thermal and chemical stability mentioned hereinabove.

Table I.—Character and composition of polymer made from hexaphenylcyclotrisilazane

| Samples | I | II | III | IV | V | VI |
|---|---|---|---|---|---|---|
| Time of heating, min | 0 | 1 | 3 | 5 | 15 | 65 |
| Temperature when sample was taken, ° C | | 540 | 558 | 561 | | 560 |
| Approximate M.P. of sample, ° C | 213–215 | 197–204 | 160–163 | 179–320 | infusbile | infusible |
| Physical state when cool | crystalline | vitreous | vitreous | vitreous | (¹) | (¹) |
| Solubility in benzene | sol | sol | sol | sol | insol | insol |

¹ Formed vitreous.

Table I. — Character and composition of polymer made from hexaphenylcyclotrisilazane—Continued

ELEMENTAL ANALYSES

|  | I | II | III | IV | V | VI |
|---|---|---|---|---|---|---|
| Carbon | 73.04 | 72.19 | 69.30 | 65.36 | 61.24 | 58.83 |
| Hydrogen | 5.58 | 5.22 | 5.11 | 4.84 | 4.29 | 4.64 |
| Nitrogen | 6.90 | 7.29 | 7.95 | 8.90 | 9.41 | 8.22 |
| Silicon | 13.97 | 15.30 | 18.00 | 19.70 | 23.10 | 30.24 |
| Total | 99.49 | 100.00 | 100.36 | 98.80 | 98.04 | 101.93 |

ELEMENTAL FORMULAS, Si=1.00

|  | I | II | III | IV | V | VI |
|---|---|---|---|---|---|---|
| Carbon | 12.16 | 10.92 | 9.01 | 7.77 | 6.22 | 4.53 |
| Hydrogen | 11.10 | 9.43 | 7.94 | 6.85 | 5.18 | 4.25 |
| Nitrogen | 0.98 | 0.95 | 0.89 | 0.91 | 0.82 | 0.54 |
| Silicon | 1.00 | 1.00 | 1.00 | 1.00 | 1.00 | 1.00 |

The change in composition during condensation polymerization of hexaphenylcyclotrisilazane is indicated in Table I and FIG. 1. Hexaphenylcyclotrisilazane was heated in a test tube, and samples were taken at frequent intervals for analysis. Sample I represents the starting material. The crystals melted when the temperature reached 215° C. and vigorous boiling began when the melt reached approximately 510° C. Boiling was continued, and the temperature rose steadily. Sample II was taken at the end of one minute of heating beyond 510° C. when the temperature was 540° C. Sample III was then taken after two additional minutes of boiling when the temperature was 558° C. Sample IV was taken two minutes later at 561° C. Shortly after sample IV was taken, a solid polymer began to appear in the melt and temperature measurement became erratic due to the fact that the mass was not uniform. After conversion to a solid was complete, sample V was taken. The product was then heated in an oven at 560° for fifty minutes to produce sample VI. FIG. 1 shows that the elemental composition progressed from $(C_6H_5)_2SiNH$ in sample I to approximately $C_6H_5SiN$ in sample V. The prolonged heating at 560° C. to produce sample VI reduced the amounts of carbon, hydrogen and nitrogen even further. Samples I–IV were soluble in benzene while samples V and VI were pale yellow, foamed, vitreous, infusible, and insoluble in aqueous acids and organic solvents.

The rate of polymerization of hexaphenylcyclotrisilazane as related to temperature is indicated by the following table:

Table II

| Oven temperature, °C.: | Time required to solidify, min. |
|---|---|
| 450 | 570 |
| 475 | 266 |
| 500 | 93 |
| 510 | 77 |
| 525 | 52 |
| 540 | 39 |
| 550 | 23 |

The data of Table II show that the time required for solidification decreased from 570 minutes at 450° C. to 23 minutes at 550° C. The products formed in all of the examples listed in Table II were foamed, brittle, vitreous solids. The polymer obtained at 450° C. was dark brown while the polymer obtained at 550° C. was yellow.

Molecular weight changes were observed during condensation polymerization of hexaphenylcyclotrisilazane. Hexaphenylcyclotrisilazane, which has a molecular weight of 597, was heated to 512° C. A sample of this melt had an observed molecular weight of 560, as measured in benzene solution by vapor osmometry. Further heating to 540° C. increased the molecular weight further to 1400. When the melt reached 560° C., the infusible and insoluble solid began to form and thereafter further measurements of molecular weights were not obtained.

Thermogravimetric analysis of the infusible polymer formed by heating hexaphenylcyclotrisilazane clearly shows its thermal stability. As shown in FIG. 2, the total weight loss on heating to 850° C. in nitrogen was 25%. The most rapid weight loss, or 15% of the total weight loss, occurred between 550° C. and 650° C. Above 650° C. the loss was only 2%.

In studies of the reaction mechanism, we have found that benzene is the only volatile product of the condensation polymerization of hexaphenylcyclotrisilazane which was produced in a significant amount. The distillate was analyzed by gas chromatography and found to be 99.1% benzene and 0.7% diphenyl, with traces of higher boiling compounds.

EXAMPLE II

Hexaphenylcyclotrisilazane was heated in a reaction chamber open to the atmosphere in the manner described in Example I except that the heating was terminated when the melt temperature reached 525° C. The product was a pale yellow, glassy solid that was soluble in benzene and other common organic solvents. The product thus formed is described herein as being the "hexaphenylcyclotrisilazane prepolymer" which is particularly adapted for use in making coatings as set forth in Example III.

EXAMPLE III

The hexaphenylcyclotrisilazane prepolymer prepared as described in Example II was dissolved in benzene to form a 10% solution. The solution was spread over aluminum and stainless steel panels and the benzene was permitted to evaporate. Each panel was then placed in an oven at 220° C. for ten minutes and then in an oven at 550° C. for ten minutes. The resulting film was hard, shiny and impervious to water, acids, and bases. The same procedure has been employed to apply coatings to copper, but the curing is done in an inert atmosphere such as nitrogen to avoid oxidation of the copper.

EXAMPLE IV

The hexaphenylcyclotrisilazane prepolymer was prepared by heating hexaphenylcyclotrisilazane for six hours in an oven at 430° C. in a vessel with a small vent opening to the atmosphere. The product produced was soluble in benzene and other organic solvents and was useful in making coatings by following the procedures set forth in Example III above.

EXAMPLE V

Hexaphenylcyclotrisilazane was partially polymerized by heating in an open test tube until the melt temperature reached 550° C. The product was dissolved in benzene to form a 2.5% solution. The solution was sperad over an aluminum panel and the benzene was allowed to evaporate in air. The panel was then heated in an oven at 520° C. for five minutes. The resulting film was smooth, colorless and transparent. Also, the resulting film was not visibly affected by benzene, acetone, alcohol, aqueous 8% sodium hydroxide or aqueous 10% hydrochloric acid when exposed for an hour. Also, films on aluminum or stainless steel remained essentially unchanged when heated for an hour at 500° C. in air.

EXAMPLE VI

Methylphenyldichlorosilane (191.1 g., 1.0 mol) was dissolved in 600 ml. of benzene and stirred under an atmosphere of ammonia for approximately 2 hours at which time no further reaction was apparent. The reaction mixture was then refluxed for four hours, during which time a very slow stream of ammonia was passed through the reaction vessel. Ammonium chloride was removed from the product by filtration, and the benzene was removed by evaporation at reduced pressure. The product, 114 g., was a cloudy, colorless viscous liquid that did not crystallize in several days at 0° C. This product is identified as a "mixture of methylphenyl silazanes." This mixture of methylphenyl silazanes was boiled gently in a reaction zone open to the atmosphere at a temperature ranging from approximately 420° C.–480° C. for approximately thirty minutes whereupon it polymerized to a foamed brittle solid.

EXAMPLE VII

A mixture of methylphenyl silazanes was prepared as described in Example VI. This mixture was heated rapidly in a flask with a narrow opening vented to the atmosphere until the temperature of the melt reached 540° C. When cooled, the product was a pale yellow, vitreous solid that was soluble in benzene and other organic liquids and is particularly adapted for use in coating applications because of its solubility, its low volatility and its ability to undergo further polymerization to a refractory solid in thin films without foaming. We have designated this product as "methylphenyl prepolymer."

EXAMPLE VIII

The methylphenyl prepolymer produced in Example VII was applied to metals in the manner described in Example III above. The resulting film was hard, shiny and impervious to water, acids, and bases.

From the foregoing, it will be seen that we have produced improved, infusible silylamine polymers which not only have high thermal and chemical stability but also have the useful ability to adhere to many materials, such as metals, ceramics and the like, thereby particularly adapting our improved product for use in forming protective coatings and adhesives. The chemical inertness of the coatings made from our improved infusible silylamine polymer is demonstrated by the fact that in actual practice we have prepared samples for analytical studies by curing the samples on aluminum and then dissolving the aluminum with either hydrochloric acid or sodium hydroxide solution. The coatings were not altered by the process of dissolving the aluminum. Also, the coatings were good electrical insulators.

We wish it to be understood that we do not desire to be limited to the precise examples, proportions or embodiments herein disclosed for obvious modifications will occur to a person skilled in the art.

What we claim is:

1. A composition comprising an infusible hexaphenylcyclotrisilazane polymer resulting from heating the hexaphenylcyclotrisilazane in a reaction zone open to the atmosphere at a temperature ranging from approximately 420° C. to 575° C. until the infusible polymer is formed.

2. A composition comprising an infusible methylphenyl silazane polymer resulting from heating methylphenyl silazane in a reaction zone open to the atmosphere at a temperature ranging from approximately 420° C. to 575° C. until the infusible polymer is formed.

3. A composition suitable for making infusible coatings comprising a solution in an organic solvent of a silylamine polymer resulting from heating in a reaction zone open to the atmosphere and at a temperature above 400° C. a silylamine selected from the group consisting of hexaphenylcyclotrisilazane and methylphenyl silazane that can be maintained in a non-vaporized state at a temperature ranging from approximately 420° C. to 575° C., said solution having as an essential characteristic the property to be applied to a surface where upon evaporation it leaves a residual coating which upon subsequent heating in an open reaction zone to a temperature ranging from approximately 420° C. to 575° C. produces an infusible coating.

4. An article of manufacture comprising a member having the surface thereof coated with an infusible silylamine polymer resulting from heating in a reaction zone open to the atmosphere at a temperature ranging from approximately 420° C. to 575° C. and until said infusible polymer is formed a coating applied to said member of a silylamine selected from the group consisting of hexaphenylcyclotrisilazane and methylphenyl silazane that can be maintained in a non-vaporized state at said temperature ranging from approximately 420° C. to 575° C.

5. The process of producing polymers having improved thermal and chemical stability from hexaphenylcyclotrisilazane which comprises:
    (a) heating hexaphenylcyclotrisilazane in a reaction zone open to the atmosphere to a temperature ranging from approximately 420° C. to 575° C., and
    (b) continuing the heating of the hexaphenylcyclotrisilazane in the open reaction zone at a temperature ranging from approximately 420° C. to 575° C. until it has been converted to an infusible polymer thereof.

6. The process of producing polymers having improved thermal and chemical stability from hexaphenylcyclotrisilazane which comprises:
    (a) heating hexaphenylcyclotrisilazane in a reaction zone open to the atmosphere to a temperature of at least 400° C. to produce a polymeric product which is soluble in an organic solvent,
    (b) dissolving said product in an organic solvent to form a solution thereof,
    (c) applying said solution to the surface of a member whereby the solvent evaporates and leaves a residual coating of said product on said surface, and
    (d) heating said coating to a temperature ranging from approximately 420° C. to 575° C. until an infusible polymer is formed thereof.

7. The process of producing polymers as defined in claim 6 in which the organic solvent is benzene.

8. The process of producing polymers having improved thermal and chemical stability from hexaphenylcyclotrisilazane which comprises:
    (a) heating hexaphenylcyclotrisilazane in a reaction chamber having a small vent opening to the atmosphere therein to a temperature of at least 400° C. to produce a product which is soluble in an organic solvent,
    (b) dissolving said product in an organic solvent to form a solution thereof,
    (c) applying said solution to the surface of a member whereby the solvent evaporates and leaves a residual coating of said product on said surface, and
    (d) heating said coating to a temperature ranging from approximately 420° C. to 575° C. until an infusible polymer is formed.

9. The process of producing polymers as defined in claim 8 in which the organic solvent is benzene.

10. The process of producing polymers having improved thermal and chemical stability from a mixture of methylphenyl silazane which comprises:
    (a) heating methylphenyl silazane in a reaction zone open to the atmosphere to a temperature ranging from approximately 420° C. to 575° C., and
    (b) continuing the heating of the methylphenyl silazane in the open reaction zone until it has been converted to an infusible, thermosetting polymer thereof.

11. The process of producing polymers having improved thermal and chemical stability from a mixture of methylphenyl silazane which comprises:
   (a) heating methylphenyl silazane in a reaction chamber having a small vent opening to the atmosphere therein to a temperature above 400° C. to produce a product which is soluble in an organic solvent,
   (b) dissolving said product in an organic solvent to form a solution thereof,
   (c) applying said solution to the surface of a member whereby the organic solvent evaporates and leaves a residual coating of said product on said surface, and
   (d) heating said coating to a temperature ranging from approximately 420° C. to 575° C. until said coating is converted to an infusible, thermosetting polymer thereof.

12. The process of producing polymers as defined in claim 11 in which the organic solvent is benzene.

References Cited by the Examiner
UNITED STATES PATENTS 2,885,370   5/1959   Groszos et al. _____ 260—2

SAMUEL H. BLECH, *Primary Examiner.*

MURRAY TILLMAN, *Examiner.*